H. DE MARTIS.
ELECTRIC BATTERY.
APPLICATION FILED AUG. 14, 1909.
1,030,650.
Patented June 25, 1912.
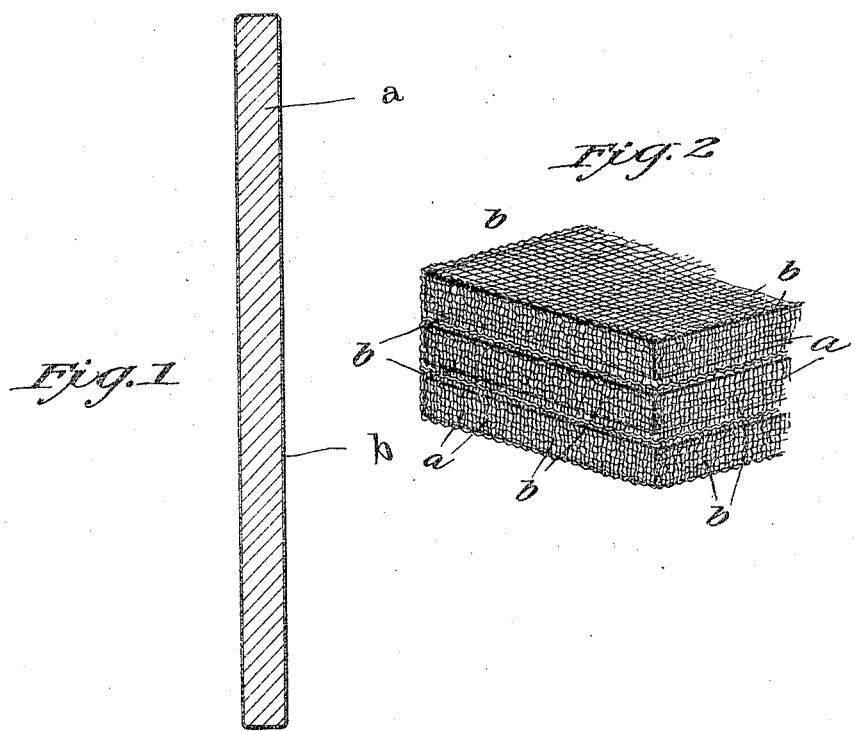
Witnesses:
Edward R. Albertson
Olive D. White
Inventor:
Horace de Martis
By Emile Bauerlein
Atty.

UNITED STATES PATENT OFFICE.

HORACE DE MARTIS, OF LONDON, ENGLAND.

ELECTRIC BATTERY.

1,030,650.

Specification of Letters Patent. Patented June 25, 1912.

Application filed August 14, 1909. Serial No. 513,198.

*To all whom it may concern:*

Be it known that I, HORACE DE MARTIS, a subject of the King of Italy, and residing at 29ª Charing Cross road, London, England, have invented certain new and useful Improvements in and Relating to Electric Batteries, of which the following is a specification.

This invention relates to the separation of electrodes in electric accumulators by means of inert material such as cellulose, the object being to provide a separator which is substantially pure cellulose but is of a porous nature or arranged so as to permit of the free passage through it of the electrolyte, and further to enable such a separator to be produced easily and economically.

The invention consists in producing a separator by taking a woven vegetable fabric, treating it in such a manner as to remove all impurities such as fat, resin, wax, pectic acid and the like, and so as to leave only the fibrous part viz., the cellulose; and then inserting the same between the electrodes to be separated, the separator being simply laid against the paste on the electrodes and being quite independent thereof so that it is not impregnated with or rendered impervious by the paste.

It will be understood that the pectic acid mentioned above is produced by the fermentation of the pectose in the maceration process *i. e.* the process of steeping the raw material in water. The separating medium is of a porous nature allowing of ready percolation of the acidulated liquid but preventing short circuiting of the plates. Moreover it is very light and thin allowing of the plates being packed closely together.

It is obvious that with the perforated celluloid or ebonite separators only those parts of the electrodes which face one another across the perforations take part to the full extent in the electrolytic action. The same difficulty has up to the present time also been found in separators of vegetable tissue, the cellulose forming a resistance to the electrolytic action and permitting such action only in the interstices of the separator the only exception being wood separators, which split and cause short-circuiting. In vegetable separators constructed or prepared in accordance with my invention these objections have been overcome and my separator is porous at every point because the fiber is not destroyed so that a much greater capacity can be obtained from a given size of plate or electrode surface. Vegetable tissues present a great resistance to the passage of the current by reason of the foreign matters which they contain, namely nitrogenous fatty, waxy, resinous, etc., matters and these are removed as hereinafter described.

In carrying the invention into effect in one convenient manner the separating elements are made of vegetable, woven or textile fabric from which the foreign substances such as fat, resin, wax, pectic acid, and the like are extracted by means of cuprous ammoniacal solution and leaving only the fibrous part. Great care must be taken that the vegetable tissues do not remain too long in contact with the above solution for if the treatment is continued too long, not only will the foreign substances be extracted but the fibrous portion will be dissolved. Two days' treatment is usually found long enough to separate the foreign substances.

According to another method the nitrogenous fatty, waxy, resinous, etc., matters are dissolved for example in alcohol or ether. They may also be eliminated by continuous boiling, preferably under a pressure of 5 to 6 atmospheres. It is also necessary to eliminate the pectic acid which is produced in the maceration process by the fermentation of the pectose, and which is injurious to the accumulator. For this purpose the tissue is treated in an ammoniacal or alkaline solution, care being taken that the immersion of the tissue does not exceed 24 to 30 hours. This matter does not dissolve in alkaline carbonates but combines with them and displaces the carbonic acid. The separating medium is preferably made to completely envelop the plate so as to eliminate any possibility of short circuiting.

Such construction is illustrated in the accompanying drawings in which—

Figure 1 shows a view of an electrode or plate *a*, enveloped in the separating medium *b*, Fig. 2 being a perspective view of portions of a plurality of plates or electrodes *a* enveloped in separating medium *b*, the plates being arranged horizontally.

Having now described my invention what I claim as new and desire to secure by Letters Patent is:—

1. In a secondary electric battery, plates or electrodes, and a separating medium between said plates or electrodes consisting of a vegetable woven fabric which has been treated, after weaving, so as to leave only a woven cellulose fabric the strands of which are porous.

2. In a secondary electric battery, plates or electrodes, and a separating medium between and independent of said plates or electrodes consisting of a vegetable woven fabric which has been treated, after weaving, so as to leave only a woven cellulose fabric the strands of which are porous.

In testimony whereof I affix my signature in presence of two witnesses.

HORACE DE MARTIS.

Witnesses:
BERTRAM H. MATTHEWS,
H. R. KERSLAKE.